US008400045B2

(12) United States Patent
Cho et al.

(10) Patent No.: US 8,400,045 B2
(45) Date of Patent: Mar. 19, 2013

(54) PIEZOELECTRIC MOTOR

(75) Inventors: Woo-jong Cho, Suwon-si (KR);
Mun-cheol Choi, Hwaseong-si (KR);
Chan-young Moon, Siheung-si (KR);
Dong-eui Shin, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 203 days.

(21) Appl. No.: 13/033,903

(22) Filed: Feb. 24, 2011

(65) Prior Publication Data

US 2011/0210646 A1 Sep. 1, 2011

(30) Foreign Application Priority Data

Feb. 26, 2010 (KR) .................. 10-2010-0017919

(51) Int. Cl.
*H02N 2/00* (2006.01)
(52) U.S. Cl. ........................ 310/323.13; 310/323.14

(58) Field of Classification Search ............ 310/323.13, 310/323.14
See application file for complete search history.

(56) References Cited

U.S. PATENT DOCUMENTS

| 6,198,202 | B1 * | 3/2001 | Tamai et al. ............. 310/323.15 |
| 7,834,518 | B2 * | 11/2010 | Wischnewskij et al. . 310/323.13 |
| 7,851,972 | B2 * | 12/2010 | Takasan et al. .......... 310/323.04 |

* cited by examiner

*Primary Examiner* — Thomas Dougherty
(74) *Attorney, Agent, or Firm* — Drinker Biddle & Reath LLP (57) ABSTRACT

A piezoelectric motor includes a piezoelectric element; a stator comprising a first surface and a second surface, wherein the piezoelectric element is disposed on the first surface and a plurality of projections are formed on the second surface; a rotor comprising an operating portion that contacts the plurality of projections and that rotates via waves of the stator generated by the piezoelectric element, wherein a part of each of the plurality of projections that contacts the operating portion comprises a curved contact portion.

10 Claims, 7 Drawing Sheets

PIEZOELECTRIC MOTOR

CROSS-REFERENCE TO RELATED PATENT APPLICATION

This application claims the priority benefit of Korean Patent Application No. 10-2010-0017919, filed on Feb. 26, 2010, in the Korean Intellectual Property Office, the disclosure of which is incorporated herein in its entirety by reference.

BACKGROUND

1. Field of the Invention

Embodiments relate to a piezoelectric motor, and more particularly, to a piezoelectric motor for stably maintaining a frictional contact between a rotor and a stator.

2. Description of the Related Art

In general, a piezoelectric motor includes piezoelectric elements, and converts electric energy into dynamical motion.

The piezoelectric motor is a new type of driving source that does not need a magnet or wires. In a principle of operating the piezoelectric motor, a high frequency voltage is applied to the piezoelectric elements to vibrate the piezoelectric elements. The piezoelectric motor may obtain a driving force in one direction due to the vibrations of the piezoelectric elements in order to rotate the rotor.

Types of piezoelectric motors include rotary piezoelectric motors for rotating a rotor and linear piezoelectric motors.

SUMMARY

Embodiments include a piezoelectric motor that stably maintains a frictional contact between a rotor and a stator.

According to an embodiment, a piezoelectric motor includes a piezoelectric element; a stator having a first surface and a second surface, wherein the piezoelectric element is disposed on the first surface and a plurality of projections are formed on the second surface; a rotor having an operating portion that contacts the plurality of projections and that rotates via waves of the stator generated by the piezoelectric element, wherein a part of each of the plurality of projections that contacts the operating portion comprises a curved contact portion.

The piezoelectric element may include piezoelectric ceramics.

The first and second surfaces may be parallel to each other.

The stator and rotor may have circular ring shapes.

At least one curved portion may be formed in a portion of the operating portion.

A groove may be formed in a surface of the each of the plurality of projections facing the rotor, and the curved contact portion may constitute at least a part of the groove.

A shape of the groove may be formed to accommodate a part of the operating portion.

An inclined surface may be formed on a surface of each of the plurality of projections facing the rotor, and the curved contact portion may constitute at least a part of the inclined surface.

A height of the inclined surface may be reduced from an inner side surface of the stator to an outer side surface of the stator.

A height of the inclined surface may be reduced from an outer side surface of the stator to an inner side surface of the stator.

BRIEF DESCRIPTION OF THE DRAWINGS

The above and other features and advantages will become more apparent by describing in detail exemplary embodiments with reference to the attached drawings in which.

DETAILED DESCRIPTION

Hereinafter, embodiments will be described in detail with reference to the attached drawings.

Figure 1:
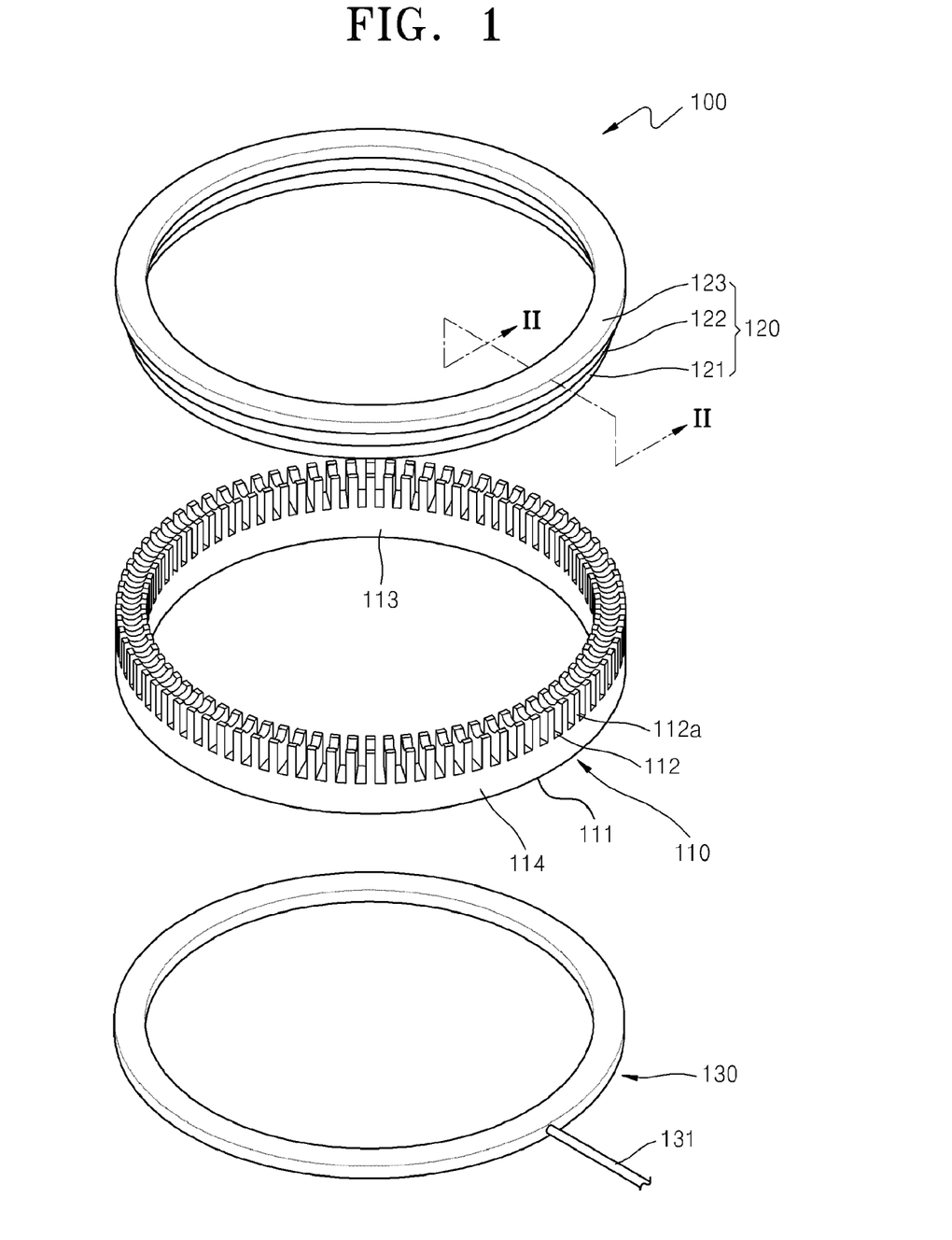
FIG. 1 is an exploded perspective view of a piezoelectric motor, according to an embodiment.
Figure 2:
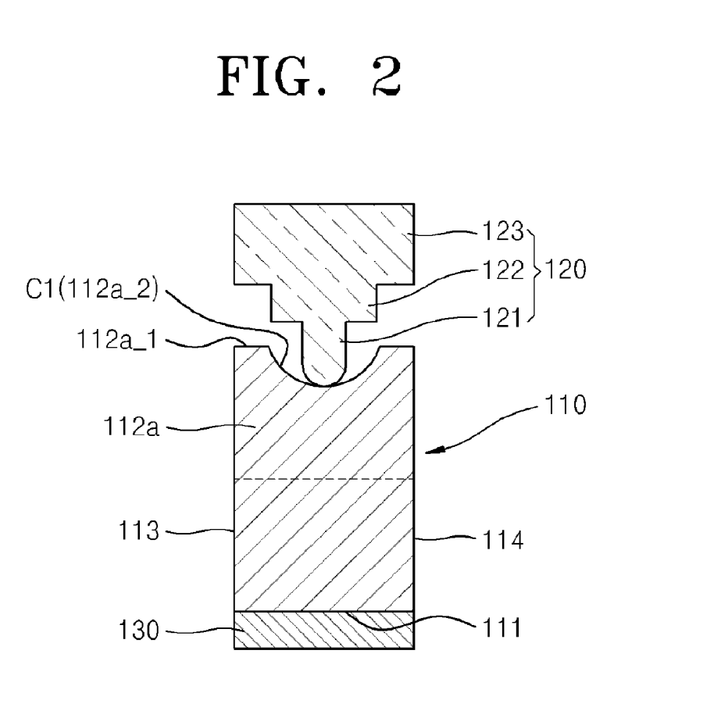
FIG. 2 is a cross-sectional view taken along a line II-II of FIG. 1, according to an embodiment.

FIG. 1 is an exploded perspective view of a piezoelectric motor 100, according to an embodiment. FIG. 2 is a cross-sectional view taken along a line II-II of FIG. 1, according to an embodiment.

Referring to FIG. 1, the piezoelectric motor 100 according to the present embodiment includes a stator 110, a rotor 120, and a piezoelectric element 130.

As shown in FIG. 1, the stator 110 has a circular ring shape.

The stator 110 includes a first surface 111, a second surface 112, an inner side surface 113 that connects the first and second surfaces 111 and 112, and an outer side surface 114 that connects the first and second surfaces 111 and 112.

The ring shape piezoelectric element 130 is disposed on the first surface 111 of the stator 110.

The second surface 112 of the stator 110 is parallel to the first surface 111. A plurality of projections 112a are arranged on the second surface 112.

The projections 112a protrude toward the rotor 120 to form a contact friction surface between the stator 110 and the rotor 120.

The projections 112a are used to amplify curved waves formed by the piezoelectric element 130. A motion of each of the projections 112a tracks an oval motion trajectory. That is, the projections 112a, which participate in forming consecutive curved waves, track the oval motion trajectory. Also, points of the projections 112a having position differences have phase differences and track the oval motion trajectory, thereby forming the consecutive curved waves.

Referring to FIG. 2, a groove 112a_2 is formed in a surface 112a_1 of the projections 112a toward the rotor 120.

The groove 112a_2 has a concave shape. The entire surface of the groove 112a_2 has a curved shape to form a curved contact portion C1.

The shape of the groove 112a_2 is formed to accommodate a part of an operating portion 121 of the rotor 120. That is, a portion 121a (refer to FIG. 3) of the operating portion 121 contacts the surface of the groove 112a_2.

According to the present embodiment, the entire surface of the groove 112a_2 has a curved shape and thus the entire surface of the groove 112a_2 constitutes the curved contact portion C1; however, this should not be construed as limiting. In more detail, in some embodiments, a part of the surface of a groove may have a curved shape and another part thereof may have a flat shape. In this case, the part of the surface of the groove having the curved shape constitutes the curved contact portion C1.

Meanwhile, with reference to FIG. 1, the rotor 120 has a circular ring shape.

The rotor 120 includes the operating portion 121, an operating portion support portion 122, and a rotor body 123.

The operating portion 121 contacts the projections 112a. In more detail, the operating portion 121 contacts the surface (the curved contact portion C1) of the groove 112a_2 formed in the projections 112a, and turns consecutive curved waves from the projections 112a of the stator 110 into a rotary motion of the rotor 120.

Figure 3:
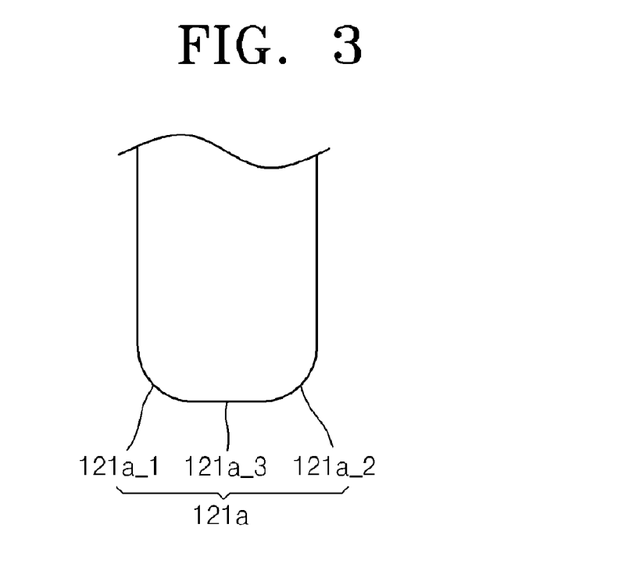
FIG. 3 is a cross-sectional view of an operating portion, according to an embodiment.
Figure 4:
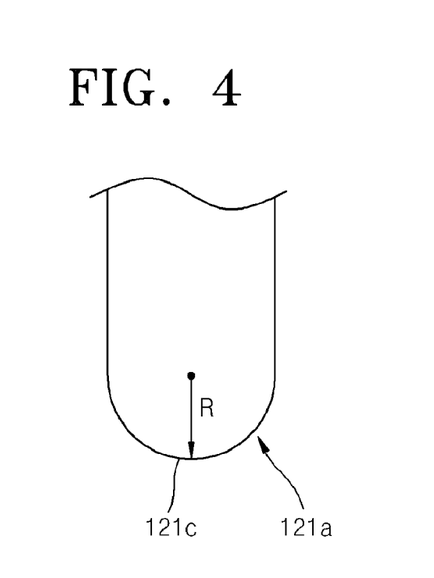
FIG. 4 is a cross-sectional view of an operating portion, according to another embodiment.

FIG. 3 is a cross-sectional view of the operating portion 121, according to an embodiment. FIG. 4 is a cross-sectional view of the operating portion 121, according to another embodiment.

Referring to FIG. 3, curved portions 121a_1 and 121a_2 are formed on the portion 121a of the operating portion 121, i.e., portions of the operation portion 121 that contact the surface (the curved contact portion C1) of the groove 112a_2. The curved portions 121a_1 and 121a_2 are formed in the portion 121a of the operating portion 121. More specifically, the portion 121a of the operating portion 121 includes the curved portions 121a_1 and 121a_2 and a flat portion 121a_3 formed therebetween.

The curved portions 121a_1 and 121a_2 facilitate more stably contacting the operating portion 121 and the surface (the curved contact portion C1) of the groove 112a_2 to each other, thereby reducing a driving error of the piezoelectric motor 100, and remarkably reducing abrasions between the operating portion 121 and the projections 112a.

According to the present embodiment, the portion 121a of the operating portion 121 includes the curved portions 121a_1 and 121a_2 and the flat portion 121a_3 formed therebetween; however, this should not be construed as limiting. That is, in some embodiments, the portion 121a of the operating portion 121 may be formed as an arc 121c having a radius R as shown in FIG. 4. In this case, the portion 121a of the operating portion 121 that contacts the projections 112a includes no flat portion and thus the operating portion 121 may more softly and stably contact the surface (the curved contact portion C1) of the groove 112a_2.

Meanwhile, the operating portion support portion 122 has a circular ring shape to support the operating portion 121.

The rotor body 123 has a circular ring shape and rotates by a rotary force received from the operating portion support portion 122. In addition, the rotor body 123 occupies a majority of the mass of the rotor 120 and has a relatively great moment of inertia and thus offsets fluctuations in torque.

Meanwhile, the piezoelectric element 130 includes a ring shaped plate and piezoelectric ceramics. The piezoelectric element 130 is adhered onto the first surface 111 by using an adhesive. The adhesive may be an epoxy-based adhesive, a solvent evaporation type adhesive, or the like.

The piezoelectric element 130 is divided into a plurality of polarization regions in a circumferential direction. The polarization direction is perpendicular to the first surface 111. The polarity direction of polarization is designed in such a way that the rotor 120 rotates according to an extending and shrinking action of each of the polarization regions.

The piezoelectric element 130 receives a driving voltage through a cable 131. The piezoelectric element 130 generally receives a cosine wave voltage and a sine wave voltage. In this regard, input voltages have phase differences. For example, the cosine wave voltage and the sine wave voltage having a phase difference of 90° may be applied to the piezoelectric element 130. In this case, if a driving reference voltage is $V_o$, a constant is w, and time is t, the cosine wave voltage is $V_o \times \cos(wt)$ and the sine wave voltage is $V_o \times \sin(wt)$.

In more detail, if each of the polarization regions of the piezoelectric element 130 receives driving voltages having phase differences through the cable 131, each of the polarization regions extends and shrinks, thereby generating the curved waves of the stator 110.

The structure of each of the polarization regions of the piezoelectric element 130 and the driving voltages received by the piezoelectric element 130 may use a conventional structure and driving method, and thus the detailed description thereof will not be repeated here.

An operation of the piezoelectric motor 100 of the present embodiment will now be described with reference to FIGS. 5 through 8.

Figure 5:
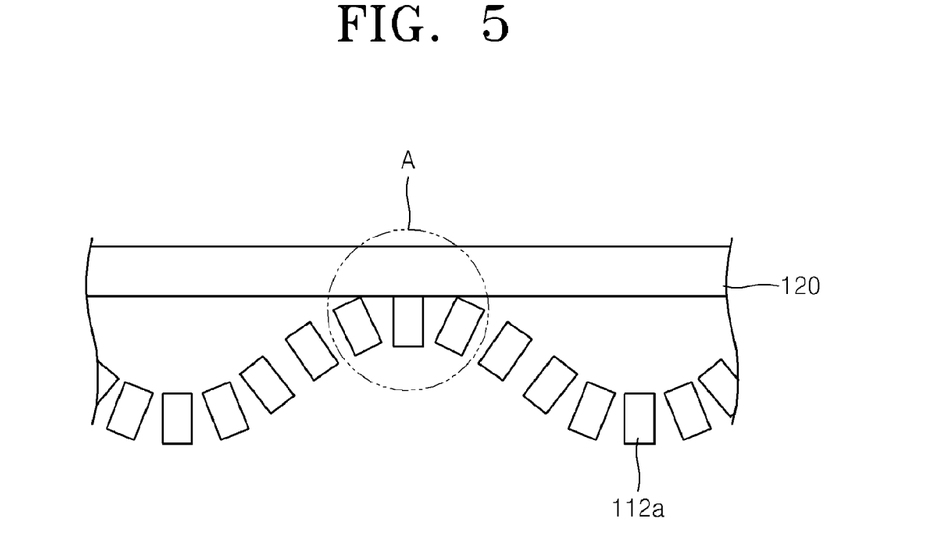
FIG. 5 is a schematic view illustrating a contact operation between projections of a stator and a rotor, according to an embodiment.
Figure 6:
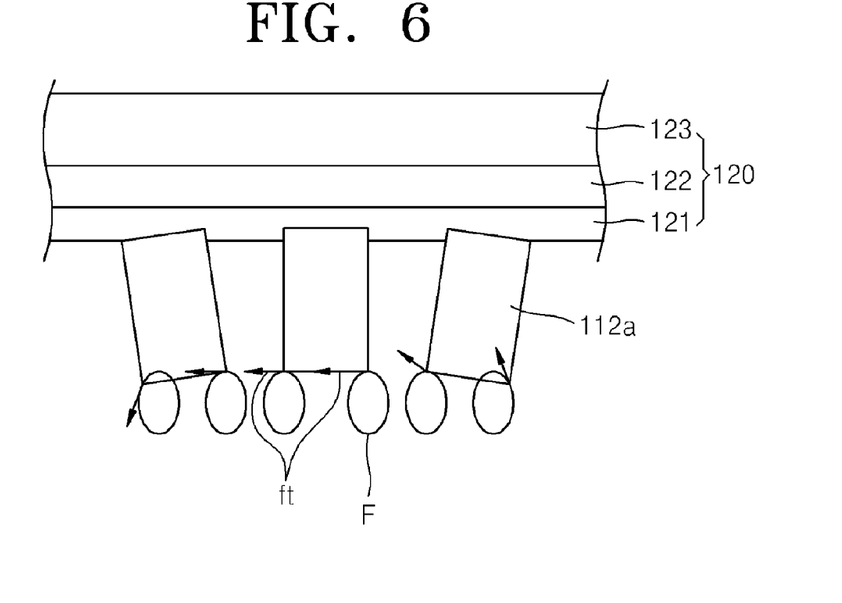
FIG. 6 is a magnified view of a part A of FIG. 5, according to an embodiment.
Figure 7:
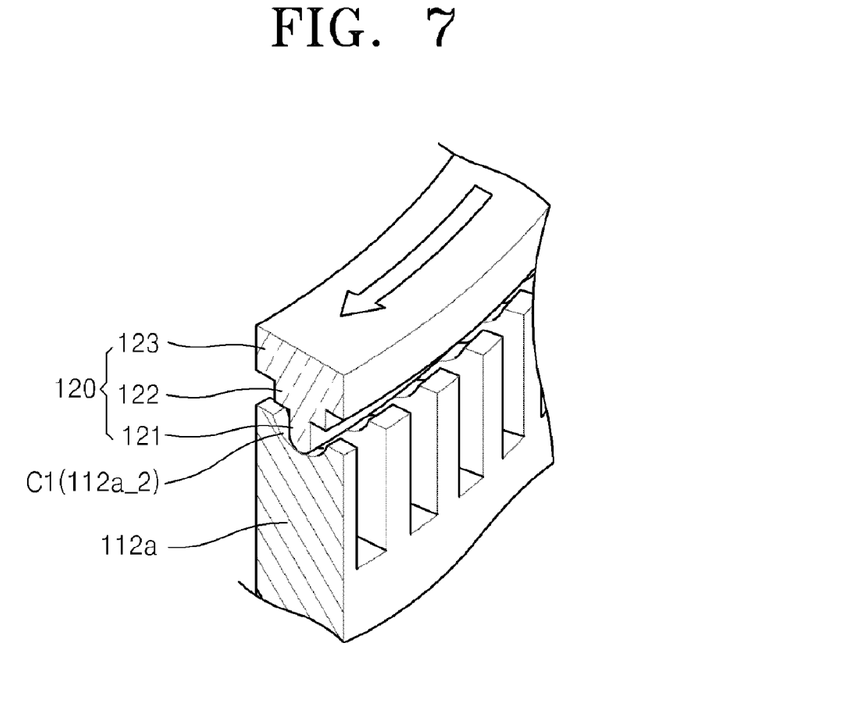
FIG. 7 is a perspective view of a contact operation between projections of a stator and a rotor, according to an embodiment.
Figure 8:
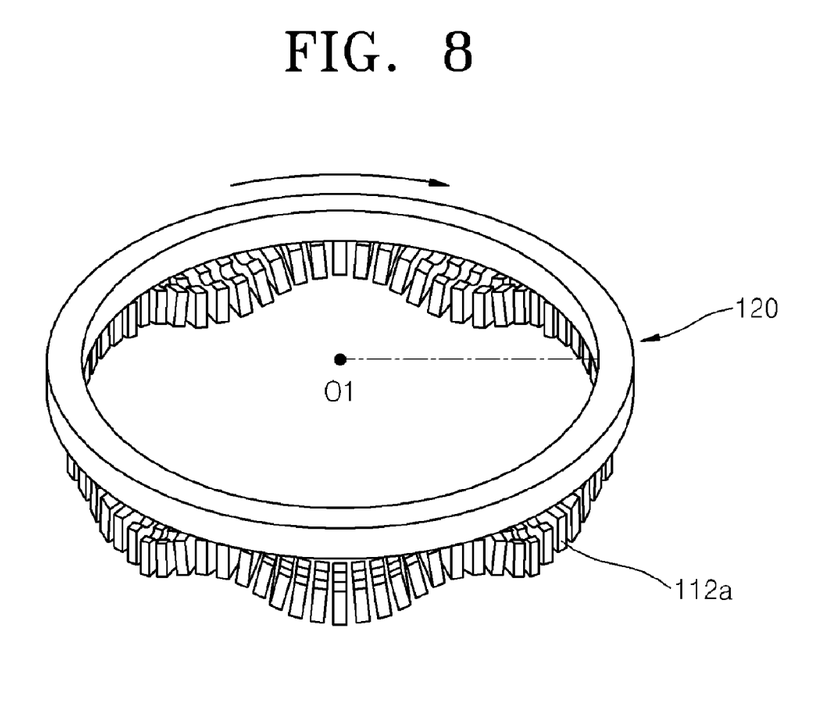
FIG. 8 is a schematic perspective view illustrating a mutual motion between projections of a stator and a rotor, according to an embodiment.

FIG. 5 is a schematic view illustrating a contact operation between projections of a stator and a rotor, according to an embodiment. FIG. 6 is a magnified view of a part A of FIG. 5, according to an embodiment. FIG. 7 is a perspective view of a contact operation between projections of a stator and a rotor, according to an embodiment. FIG. 8 is a schematic perspective view illustrating a mutual motion between projections of a stator and a rotor, according to an embodiment.

When a user applies a power source to the piezoelectric motor 100 and turns a switch on, a driving voltage is applied to the piezoelectric element 130 through the cable 131.

When the driving voltage is applied to the piezoelectric element 130, each of the polarization regions of the piezoelectric element 130 extends and shrinks in a direction perpendicular to the first surface 111 according to a frequency of the driving voltage. Extending and shrinking actions of the piezoelectric element 130 causes the stator 110 to generate consecutive curved waves. In this case, referring to FIG. 5, a rotary force starts to be transmitted to the rotor 120 due to a contact between the projections 112a and the rotor 120.

In more detail, referring to FIG. 6, a motion trajectory F of the projections 112a is elliptical, and the projections 112a transmit the rotary force to the rotor 120 due to a tangential motion $f_t$ on the motion trajectory F.

Referring to FIG. 7, the operating portion 121 of the rotor 120 contacts the surface (the curved contact portion C1) of the groove 112a_2 formed in the projections 112a and receives the rotary force. However, the surface (the curved contact portion C1) of the groove 112a_2 facilitates more stably maintaining a contact action between the operating portion 121 and the surface (the curved contact portion C1) of the groove 112a_2. That is, a frictional contact between the operating portion 121 and the surface (the curved contact portion C1) of the groove 112a_2 is maintained, which facilitates uniform friction and reduces driving error, abrasion, noise, and vibration, thereby increasing the lifetime of the piezoelectric motor 100. The maintained frictional contact also reduces a sliding friction and increases a rolling friction, thereby increasing efficiency of the piezoelectric motor 100.

Further, since the groove 112a_2 has a concave shape, a force is applied to place the portion 121a of the operating portion 121 in a center (i.e., the lowest portion) of the groove 112a_2. That is, although the rotor 120 rotates, since the groove 112a_2 of the projections 112a prevents the operating portion 121 from escaping from the groove 112a_2, the groove 112a_2 performs a self-centering operation of preventing a rotary center of the rotor 120 from misaligning.

Referring to FIG. 8, a curved wave motion of the stator 110 caused by the piezoelectric element 130 wholly works on the rotor 120. Thus, the rotor 120 rotates about a rotary center O1, thereby driving the piezoelectric motor 100.

As described above, the piezoelectric motor 100 according to the present embodiment may stably perform a frictional contact operation since the operating portion 121 contacts the surface (the curved contact portion C1) of the groove 112a_2 formed in the projections 112a during the rotary motion of the rotor 120, and since the groove 112a_2 prevents the rotary center of the rotor 120 from misaligning.

A piezoelectric motor 200 according to another embodiment will now be described with reference to FIGS. 9 and 10 in terms of differences between the piezoelectric motor 100 of the previous embodiment and the piezoelectric motor 200 of the present embodiment.

Figure 9:
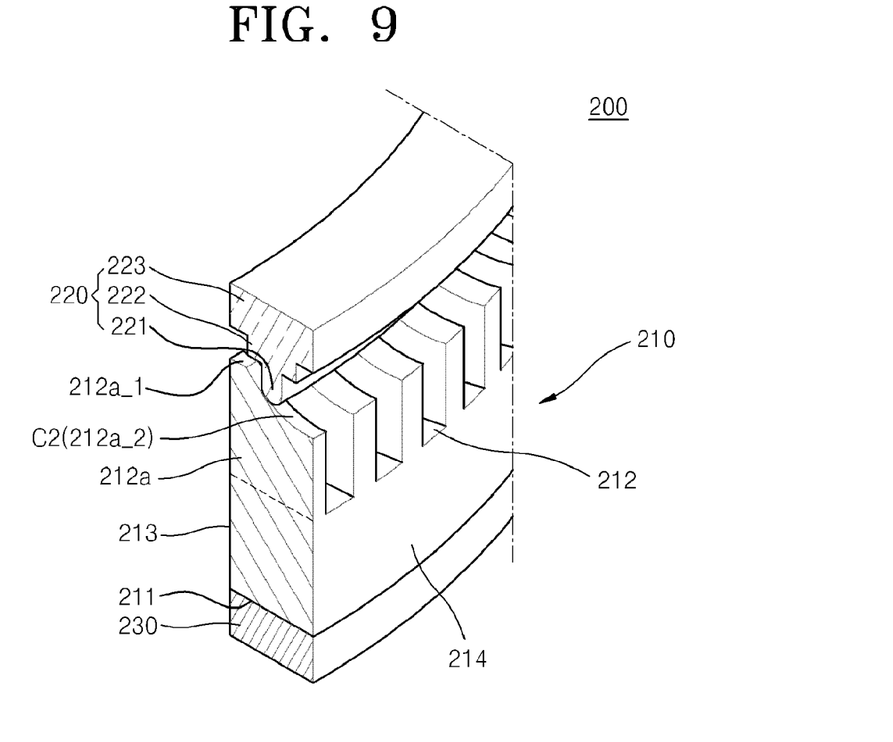
FIG. 9 is a perspective view of a partial cutaway of a piezoelectric motor, according to another embodiment.

FIG. 9 is a perspective view of a partial cutaway of the piezoelectric motor 200, according to another embodiment. FIG. 10 is a cross-sectional view of the piezoelectric motor 200 of FIG. 9, according to an embodiment.

Referring to FIG. 9, the piezoelectric motor 200 of the present embodiment includes a stator 210, a rotor 220, and a piezoelectric element 230.

The stator 210 includes a first surface 211, a second surface 212, an inner side surface 213 that connects the first surface 211 and the second surface 212, and an outer side surface 214 that connects the first surface 211 and the second surface 212.

A plurality of projections 212a are arranged on the second surface 212 of the stator 210. A surface of the projection 212a that faces the rotor 220 includes a flat surface 212a1 and an inclined surface 212a_2.

The inclined surface 212a_2 has an entirely curved shaped and constitutes a curved contact portion C2.

According to the present embodiment, although the inclined surface 212a_2 has an entirely curved shaped and constitutes the curved contact portion C2, this should not be construed as limiting. That is, the inclined surface 212a_2 may have a partially curved shape, and thus the partially curved inclined surface 212a_2 may constitute the curved contact portion C2 according to an embodiment.

Meanwhile, a height H1 of an innermost side portion (closest to a rotary center O2) of the inclined surface 212a_2 is higher than a height H2 of an outermost side portion thereof. That is, the height of the inclined surface 212a_2 is reduced from the inside thereof to the outside thereof.

Meanwhile, the rotor 220 has a circular ring shape and includes an operating portion 221, an operating portion support portion 222, and a rotor body 223.

The piezoelectric element 230 includes a ring shaped plate, and is adhered onto the first surface 211 by using an adhesive.

The rotor 220 and the piezoelectric element 230 are the same as the rotor 120 and the piezoelectric motor 130 of the previous embodiment and thus the descriptions thereof will not be repeated here.

An operation of the piezoelectric motor 200 of the present embodiment will now be described.

When a user applies a power source to the piezoelectric motor 200 and turns on a switch, a driving voltage is applied to the piezoelectric element 230.

When the driving voltage is applied to the piezoelectric element 230, each of the polarization regions of the piezoelectric element 230 extends and shrinks in a direction perpendicular to the first surface 211 according to a frequency of the driving voltage. Extending and shrinking actions of the piezoelectric element 230 cause the stator 210 to generate consecutive curved waves. In this case, a rotary force starts to be transmitted to the rotor 220 due to a contact between the projections 212a and the rotor 220, and the rotor 220 rotates around the rotary center O2, thereby driving the piezoelectric motor 200.

The operating portion 221 of the rotor 220 contacts the inclined surface 212a_2 (the curved contact portion C2) formed in the projections 212a and receives the rotary force. However, the inclined surface 212a_2 (the curved contact portion C2) of the projections 212a facilitates more stably maintaining a contact action between the operating portion 221 and the inclined surface 212a_2 (the curved contact portion C2). That is, a frictional contact between the operating portion 221 and the inclined surface 212a_2 (the curved contact portion C2) is maintained, which facilitates a uniform friction and reduces driving error, abrasion, noise, and vibration, thereby increasing the lifetime of the piezoelectric motor 200. The maintained frictional contact also reduces a sliding friction and increases a rolling friction, thereby increasing efficiency of the piezoelectric motor 200.

As described above, the height H1 of the innermost side portion (closest to the rotary center O2) of the inclined surface 212a_2 is higher than the height H2 of the outermost side portion thereof. That is, the height of the inclined surface 212a_2 is reduced from the inner side surface 213 of the stator 210 to the outer side surface 214 thereof, and thus the operating portion 221 easily slides to the outside thereof along the inclined surface 212a_2.

Figure 10:
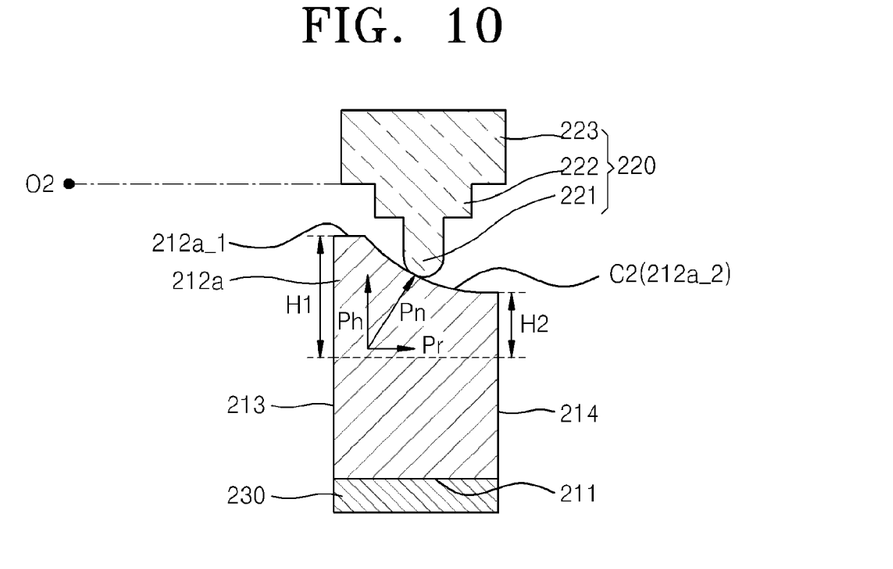
FIG. 10 is a cross-sectional view of the piezoelectric motor of FIG. 9, according to an embodiment.

In more detail, as shown in FIG. 10, a vertical reaction force Pn is exerted on the operating portion 221 from the inclined surface 212a_2 by the contact action, and is divided into a force Pr in a radius direction and a force Ph in a height direction according to an inclination of the inclined surface 212a_2. In this regard, the force Pr in the radius direction equally works in the ring shaped operating portion 221 and pushes each portion of the operating portion 221 in an outward direction away from the rotary center O2, thereby performing a self-centering operation of preventing a rotary center of the rotor 220 from misaligning.

As described above, the piezoelectric motor 200 according to the present embodiment may stably maintain a frictional contact since the operating portion 221 contacts the inclined surface 212a_2 (the curved contact portion C2) formed in the projections 212a during rotation of the rotor 220, and prevent the rotary center of the rotor 220 from misaligning due to the inclined surface 212a_2.

Descriptions of other aspects of the structure, operation, and effect of the piezoelectric motor 200 of the present embodiment which are the same as those of the piezoelectric motor 100 of the previous embodiment will not be repeated here.

A piezoelectric motor 300 according to another embodiment will now be described with reference to FIGS. 11 and 12 in terms of differences between the piezoelectric motor 100 of the previous embodiment and the piezoelectric motor 300 of the present embodiment.

Figure 11:
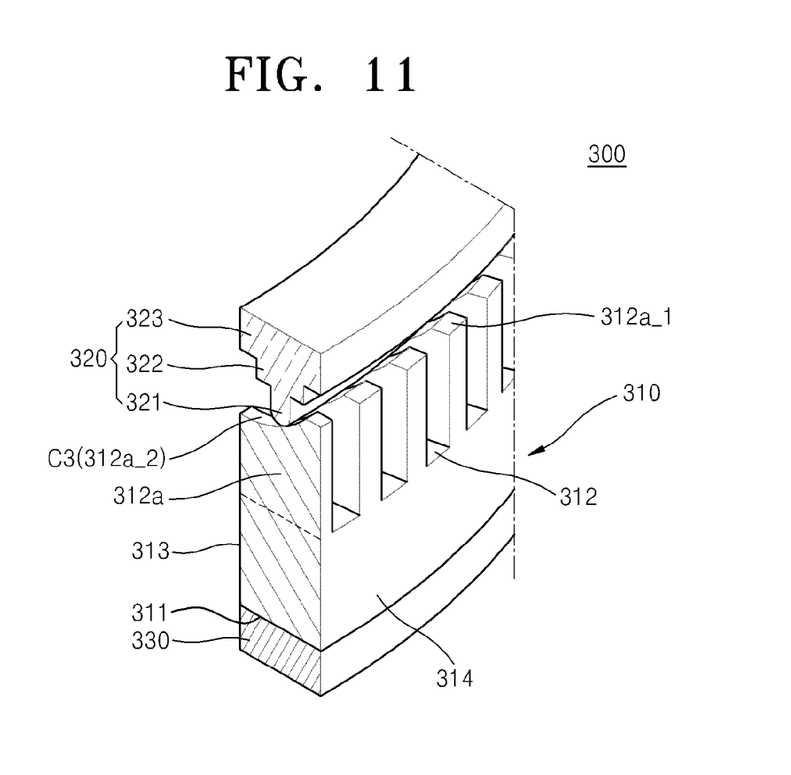
FIG. 11 is a perspective view of a partial cutaway of a piezoelectric motor, according to another embodiment.

FIG. 11 is a perspective view of a partial cutaway of the piezoelectric motor 300, according to another embodiment.

Figure 12:
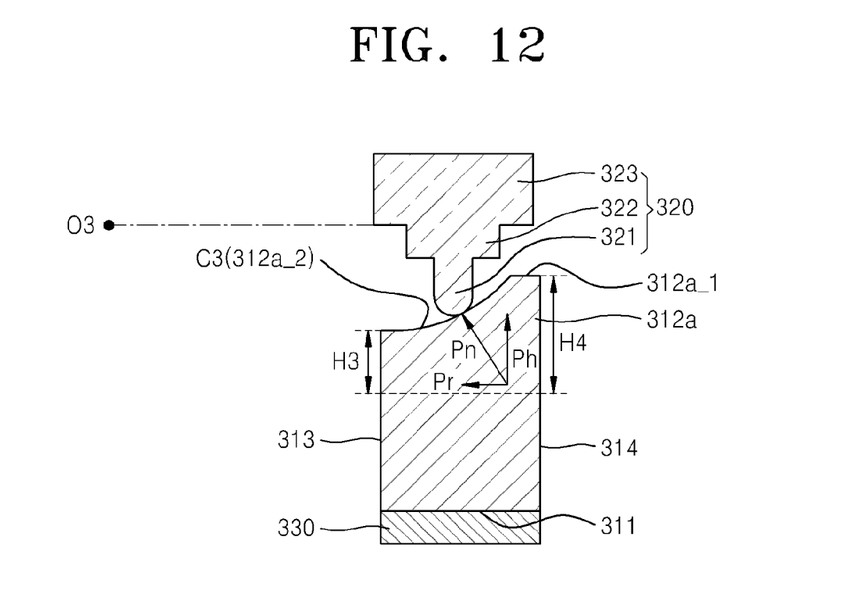
FIG. 12 is a cross-sectional view of the piezoelectric motor of FIG. 11, according to an embodiment.

FIG. 12 is a cross-sectional view of the piezoelectric motor 300 of FIG. 11, according to an embodiment.

Referring to FIG. 11, the piezoelectric motor 300 of the present embodiment includes a stator 310, a rotor 320, and a piezoelectric element 330.

The stator 310 includes a first surface 311, a second surface 312, an inner side surface 313 that connects the first surface 311 and the second surface 312, and an outer side surface 314 that connects the first surface 311 and the second surface 312.

A plurality of projections 312a are formed in the second surface 312 of the stator 310. A surface of the projection 312a that faces the rotor 320 includes a flat surface 312a_1 and an inclined surface 312a_2.

The inclined surface 312a_2 has an entirely curved shape and constitutes a curved contact portion C3.

According to the present embodiment, although the inclined surface 312a_2 has an entirely curved shape and constitutes the curved contact portion C3, this should not be construed as limiting. That is, the inclined surface 312a_2 may have a partially curved shape, and thus the partially curved inclined surface 312a_2 may constitute the curved contact portion C3 according to an embodiment.

Meanwhile, a height H3 of an innermost side portion (closest to a rotary center O3) of the inclined surface 312a_2 is lower than a height H4 of an outermost side portion thereof. That is, the height of the inclined surface 312a_2 is reduced from the outside thereof to the inside thereof.

Meanwhile, the rotor 320 has a circular ring shape and includes an operating portion 321, an operating portion support portion 322, and a rotor body 323.

The piezoelectric element 330 includes a ring shaped plate, and is adhered onto the first surface 311 by using an adhesive.

The rotor 320 and the piezoelectric element 330 are the same as the rotor 120 and the piezoelectric motor 130 of the previous embodiment and thus the descriptions thereof will not be repeated here.

An operation of the piezoelectric motor 300 of the present embodiment will now be described.

When a user applies a power source to the piezoelectric motor 300 and a switch is turned on, a driving voltage is applied to the piezoelectric element 330.

When the driving voltage is applied to the piezoelectric element 330, each of polarization regions of the piezoelectric element 330 extends and shrinks in a direction perpendicular to the first surface 311 according to a frequency of the driving voltage. Extending and shrinking actions of the piezoelectric element 330 generate consecutive curved waves. In this case, a rotary force starts to be transmitted to the rotor 320 due to a contact between the projections 312a and the rotor 320, and the rotor 320 rotates about the rotary center O3, thereby driving the piezoelectric motor 300.

The operating portion 321 of the rotor 320 contacts the inclined surface 312a_2 (the curved contact portion C3) formed in the projections 312a and receives the rotary force. However, the inclined surface 312a_2 (the curved contact portion C3) of the projections 312a facilitates more stably maintaining a contact action between the operating portion 321 and the inclined surface 312a_2 (the curved contact portion C3). That is, a frictional contact between the operating portion 321 and the inclined surface 312a_2 (the curved contact portion C3) is maintained, which facilitates a uniform friction and reduces driving error, abrasion, noise, and vibration, thereby increasing the lifetime of the piezoelectric motor 300. The maintained frictional contact also reduces a sliding friction and increases a rolling friction, thereby increasing efficiency of the piezoelectric motor 300.

As described above, the height H3 of the innermost side portion (closest to the rotary center O3) of the inclined surface 312a_2 is lower than the height H4 of the outermost side portion thereof. That is, the height of the inclined surface 312a2 is reduced from the outer side surface 314 of the stator 310 to the inner side surface 313 thereof, and thus the operating portion 321 easily slides to the inside thereof along the inclined surface 312a_2.

In more detail, as shown in FIG. 12, a vertical reaction force Pn is exerted on the operating portion 321 from the inclined surface 312a_2 by the contact action, and is divided into a force Pr in a radius direction and a force Ph in a height direction according to an inclination of the inclined surface 312a_2. In this regard, the force Pr in the radius direction equally works in the ring shaped operating portion 321 and pushes each portion of the operating portion 321 in an inward direction toward the rotary center O3, thereby performing a self-centering operation of preventing a rotary center of the rotor 320 from misaligning.

As described above, the piezoelectric motor 300 according to the present embodiment may stably maintain a frictional contact since the operating portion 321 contacts the inclined surface 312a_2 (the curved contact portion C3) formed in the projections 312a during rotation of the rotor 320, and prevent the rotary center of the rotor 320 from misaligning due to the inclined surface 312a_2.

Descriptions of other aspects of the structure, operation, and effect of the piezoelectric motor 300 of the present embodiment which are the same as those of the piezoelectric motor 100 of the previous embodiment will not be repeated here.

As described above, according to various embodiments, a piezoelectric motor may stably maintain a frictional contact between a rotor and a stator.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a"

and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A piezoelectric motor comprising:
a piezoelectric element;
a stator comprising a first surface and a second surface, wherein the piezoelectric element is disposed on the first surface and a plurality of projections are formed on the second surface;
a rotor comprising an operating portion that contacts the plurality of projections and that rotates via waves of the stator generated by the piezoelectric element,
wherein a part of each of the plurality of projections that contacts the operating portion comprises a curved contact portion.

2. The piezoelectric motor of claim 1, wherein the piezoelectric element comprises piezoelectric ceramics.

3. The piezoelectric motor of claim 1, wherein the first and second surfaces are parallel to each other.

4. The piezoelectric motor of claim 1, wherein the stator and rotor have circular ring shapes.

5. The piezoelectric motor of claim 1, wherein at least one curved portion is formed in a portion of the operating portion.

6. The piezoelectric motor of claim 1, wherein a groove is formed in a surface of each of the plurality of projections facing the rotor, and the curved contact portion constitutes at least a part of the groove.

7. The piezoelectric motor of claim 6, wherein a shape of the groove is formed to accommodate a part of the operating portion.

8. The piezoelectric motor of claim 1, wherein an inclined surface is formed on a surface of each of the plurality of projections facing the rotor, and the curved contact portion constitutes at least a part of the inclined surface.

9. The piezoelectric motor of claim 8, wherein a height of the inclined surface is reduced from an inner side surface of the stator to an outer side surface of the stator.

10. The piezoelectric motor of claim 8, wherein a height of the inclined surface is reduced from an outer side surface of the stator to an inner side surface of the stator.

* * * * *